University States Patent  
Ankyu et al.

(10) Patent No.: US 9,230,722 B2  
(45) Date of Patent: *Jan. 5, 2016

(54) FERRITE CERAMIC COMPOSITION, CERAMIC ELECTRONIC COMPONENT, AND PROCESS FOR PRODUCING CERAMIC ELECTRONIC COMPONENT

(71) Applicant: MURATA MANUFACTURING CO., LTD., Kyoto-fu (JP)

(72) Inventors: Tomoyuki Ankyu, Kyoto-fu (JP); Atsushi Yamamoto, Kyoto-fu (JP); Yuko Nomiya, Kyoto-fu (JP); Wataru Kanami, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/550,546

(22) Filed: Nov. 21, 2014

(65) Prior Publication Data

US 2015/0077210 A1 Mar. 19, 2015

Related U.S. Application Data

(62) Division of application No. 13/601,917, filed on Aug. 31, 2012.

(30) Foreign Application Priority Data

Sep. 2, 2011 (JP) .................................. 2011-192021

(51) Int. Cl.  
*H01F 5/00* (2006.01)  
*H01F 1/01* (2006.01)  
(Continued)

(52) U.S. Cl.  
CPC ........ *H01F 1/01* (2013.01); *B32B 18/00* (2013.01); *C04B 35/265* (2013.01);  
(Continued)

(58) Field of Classification Search  
CPC ........................ H01F 5/00; H01F 27/00–27/35  
USPC ............................. 336/65, 83, 200, 233–234  
See application file for complete search history.

(56) References Cited

U.S. PATENT DOCUMENTS 6,804,876 B1 10/2004 Ito et al.  
7,843,701 B2 11/2010 Kudo et al.  
(Continued)

FOREIGN PATENT DOCUMENTS

CN 1673176 A 9/2005  
CN 1993780 A 7/2007  
(Continued)

OTHER PUBLICATIONS

Chinese Office Action; CN201210313966.1; Dec. 30, 2013.  
(Continued)

*Primary Examiner* — Tuyen Nguyen  
(74) *Attorney, Agent, or Firm* — Studebaker & Brackett PC

(57) ABSTRACT

This disclosure provides a ferrite ceramic composition, a ceramic electronic component including the ceramic composition, and a process of producing a ceramic electronic component including the ferrite ceramic composition, of which the insulation performance can be secured even when fired simultaneously with a metal wire material containing Cu as the main component, and which can have good electric properties. The ferrite ceramic composition includes an Ni—Mn—Zn-based ferrite having a molar content of CuO of 5 mol % or less and in which, when the molar content (x) of $Fe_2O_3$ and the molar content (y) of $Mn_2O_3$ are expressed by a coordinate point (x,y), the coordinate point (x,y) is located in an area bounded by coordinate points A (25,1), B (47,1), C (47,7.5), D (45,7.5), E (45,10), F (35,10), G (35,7.5) and H (25,7.5).

16 Claims, 5 Drawing Sheets

(51) Int. Cl.

| | | |
|---|---|---|
| *H01F 17/04* | (2006.01) | |
| *B32B 18/00* | (2006.01) | |
| *C04B 35/26* | (2006.01) | |
| *C04B 35/626* | (2006.01) | |
| *C04B 35/634* | (2006.01) | |
| *C04B 35/638* | (2006.01) | |
| *H01F 1/34* | (2006.01) | |
| *H01F 3/08* | (2006.01) | |
| *H01F 27/33* | (2006.01) | |
| *H01F 27/29* | (2006.01) | |

(52) U.S. Cl.
CPC .......... *C04B 35/6262* (2013.01); *C04B 35/638* (2013.01); *C04B 35/6342* (2013.01); *H01F 1/344* (2013.01); *H01F 3/08* (2013.01); *H01F 5/00* (2013.01); *H01F 17/04* (2013.01); *H01F 27/33* (2013.01); *C04B 2235/3265* (2013.01); *C04B 2235/3279* (2013.01); *C04B 2235/3281* (2013.01); *C04B 2235/3284* (2013.01); *C04B 2235/604* (2013.01); *C04B 2235/6025* (2013.01); *C04B 2235/6567* (2013.01); *C04B 2235/6584* (2013.01); *C04B 2235/96* (2013.01); *C04B 2237/34* (2013.01); *C04B 2237/68* (2013.01); *C04B 2237/704* (2013.01); *H01F 27/292* (2013.01)

(56) References Cited

U.S. PATENT DOCUMENTS

| | | | |
|---|---|---|---|
| 7,911,295 | B2 | 3/2011 | Inuzuka et al. |
| 2004/0246088 | A1 | 12/2004 | Shoji et al. |
| 2005/0199852 | A1 | 9/2005 | Takenoshita |
| 2007/0077458 | A1 | 4/2007 | Shoji et al. |
| 2007/0242416 | A1* | 10/2007 | Saito et al. .................. 361/321.1 |
| 2009/0003191 | A1 | 1/2009 | Inuzuka et al. |
| 2010/0283447 | A1 | 11/2010 | Tachibana et al. |
| 2011/0095856 | A1 | 4/2011 | Nakajima et al. |
| 2012/0236459 | A1* | 9/2012 | Ohira et al. ................... 361/270 |
| 2012/0297610 | A1 | 11/2012 | Yamamoto et al. |

FOREIGN PATENT DOCUMENTS

| | | |
|---|---|---|
| CN | 102017028 A | 4/2011 |
| JP | 03-093667 A | 4/1991 |
| JP | 07-022266 A | 1/1995 |
| JP | 07-045932 A | 2/1995 |
| JP | 2958523 B1 | 10/1999 |
| JP | 2001-052946 A | 2/2001 |
| JP | 2005-001894 A | 1/2005 |
| JP | 2006-319009 A | 11/2006 |
| JP | 2010-018482 A | 1/2010 |
| JP | 2010-235324 A | 10/2010 |
| JP | 2011-192021 A | 9/2011 |
| KR | 2007-0061784 A | 6/2007 |
| TW | 466514 B | 12/2001 |
| WO | 2006/121003 A1 | 11/2006 |
| WO | 2011/093489 A1 | 8/2011 |

OTHER PUBLICATIONS

Korean Office Action; KR10-2012-0096120; Sep. 5, 2013.
Korean Office Action; KR10-2012-0095567; Sep. 5, 2013.
Korean Office Action; KR10-2012-0095118; Sep. 5, 2013.
Japanese Office Action; JP2011-192021; Jul. 29, 2013.
Japanese Office Action; JP2011-192022; Jul. 29, 2013.
Taiwan Office Action; TW101129688; Dec. 13, 2013.
Taiwan Office Action; TW101129688; Jul. 9, 2014.
Chinese Office Action; CN201210313755.8; Oct. 10, 2014.

* cited by examiner

FERRITE CERAMIC COMPOSITION, CERAMIC ELECTRONIC COMPONENT, AND PROCESS FOR PRODUCING CERAMIC ELECTRONIC COMPONENT

CROSS REFERENCE TO RELATED APPLICATIONS

The present application claims priority to Japanese Patent Application No. 2011-192021 filed on Sep. 2, 2011, the entire contents of this application being incorporated herein by reference in its entirety.

TECHNICAL FIELD

The technical field relates to a ferrite ceramic composition, a ceramic electronic component, and a process for producing a ceramic electronic component, and more specifically relates to a ferrite ceramic composition which can be fired simultaneously with an electrically conductive material containing Cu as the main component, a ceramic electronic component (e.g., a chip-type inductor) which is produced using the ferrite ceramic composition, and a process for producing the ceramic electronic component.

BACKGROUND

In recent years, ceramic electronic components have been used widely in various fields, and chip-type inductors have been used widely as filters for high frequency applications that can remove noises generated in electronic devices such as mobile phones and notebook-size personal computers.

As for the processes for producing this type of chip-type inductor, various processes are known. For example, JP 7-22266 A (claim 1, claim 2, paragraph Nos. [0007], [0017], etc.) proposes a process for producing an inductor element, which comprises: repeating a step, which comprises printing a ferrite paste containing an organic binder on a substrate and drying the printed ferrite paste, multiple times, thereby forming a first ferrite green sheet layer; placing a metal conductive body on the first ferrite green sheet layer; repeating a step, which comprises printing the ferrite paste on the first ferrite green sheet layer and the metal conductive body and drying the printed ferrite paste, multiple times, thereby forming a second ferrite green sheet layer on the first ferrite green sheet layer and the metal conductive body; compressing the first ferrite green sheet layer, the metal conductive body and the second ferrite green sheet layer together; and firing the compressed product.

In JP 7-22266 A (claim 1, claim 2, paragraph Nos. [0007], [0017], etc.), it is described that one metal selected from Ag, Pd, Pt, Ni and Cu or an alloy of at least two metals selected from the above-mentioned metals is used as the metal conductive body.

In JP 7-22266 A (claim 1, claim 2, paragraph Nos. [0007], [0017], etc.), it is contemplated to produce a high-quality chip-type inductor within a short time and without causing any structural defect and so on by employing the above-mentioned process.

JP 2001-52946 A (claim 1, paragraph Nos. [0014], [0026], etc.) proposes a process for producing a chip-type inductor, which comprises the steps of: inserting a conductive wire comprising a metal wire into a molding mold, holding both ends of the conductive wire by a support section formed inside of the molding mold to position the conductive wire at the center of the molding mold; injecting a magnetic ceramic slurry into the molding mold; molding the ceramic slurry that has been injected into the molding mold by a wet-mode pressing technique to form a molding having the conductive wire embedded therein; firing the molding to produce a magnetic core; and forming external electrodes, which are respectively connected to both ends of the conductive wire, at both end surfaces of the fired magnetic core.

In JP 2001-52946 A (claim 1, paragraph Nos. [0014], [0026], etc.), it is described that Ag, Cu or an alloy of either one of these metals is used as the conductive wire.

In JP 2001-52946 A (claim 1, paragraph Nos. [0014], [0026], etc.), it is contemplated to produce a high-density and high-quality chip-type inductor by producing the molding having the conductive wire embedded therein by a wet-mode pressing technique.

SUMMARY

The present disclosure provides a ferrite ceramic composition, a ceramic electronic component including the ceramic composition, and a process of producing a ceramic electronic component including the ferrite ceramic composition of which the insulation performance can be secured even when fired simultaneously with a metal wire material containing Cu as the main component and which can exhibit good electric properties.

In one aspect of the disclosure, a ferrite ceramic composition comprises at least Fe, Mn, Ni and Zn, where in ferrite ceramic composition, a molar content of Cu is 0 to 5 mol % in terms of CuO content, and is characterized in that, when a molar content (x (mol %)) of Fe in terms of $Fe_2O_3$ content and a molar content (y (mol %)) of Mn in terms of $Mn_2O_3$ content are expressed by a coordinate point (x,y), the coordinate point (x,y) is located in an area bounded by coordinate points A (25,1), B (47,1), C (47,7.5), D (45,7.5), E (45,10), F (35,10), G (35,7.5) and H (25,7.5).

In a more specific embodiment of the ferrite ceramic composition, a molar content of Zn may be 33 mol % or less in terms of ZnO content.

In another more specific embodiment of the ferrite ceramic composition, a molar content of Zn may be 6 mol % or more in terms of ZnO content.

In another aspect of the disclosure, a ceramic electronic component includes a magnetic body part and a metal wire material embedded in the magnetic body part, and is characterized in that the metal wire material comprises an electrically conductive material containing Cu as the main component and the magnetic body part comprises any one of the above-mentioned ferrite ceramic compositions.

In a more specific embodiment of the ceramic electronic component, the metal wire material may have a linear shape.

In another more specific embodiment of the ceramic electronic component, the metal wire material may have a spiral shape.

In yet another more specific embodiment of the ceramic electronic component, the magnetic body part may be fired in an atmosphere having an oxygen partial pressure equal to or lower than the equilibrium oxygen partial pressure for $Cu-Cu_2O$.

In another aspect of the present disclosure, a process for producing a ceramic electronic component includes a calcination step of weighing an Fe compound, an Mn compound, a Cu compound, a Zn compound and an Ni compound precisely in such a manner that a molar content of Cu becomes 0 to 5 mol % in terms of CuO content and, when a molar content (x (mol %)) of Fe in terms of $Fe_2O_3$ content and a molar content (y (mol %)) of Mn in terms of $Mn_2O_2$ content are expressed by a coordinate point (x,y), the coordinate point (x,y) can be located in an area bounded by coordinate points A (25,1), B (47,1), C (47,7.5), D (45,7.5), E (45,10), F (35, 10), G (35,7.5) and H (25,7.5), mixing the weighed compounds together, and calcining the resultant mixture, thereby producing a calcined powder. The process includes a ceramic thin layer body production step of producing ceramic thin layer bodies from the calcined powder, a laminate formation step of laminating the multiple ceramic thin layer bodies on each other in such a manner that a metal wire material containing Cu as the main component and having a linear shape is intercalated between at least a pair of the ceramic thin layer bodies, thereby forming a laminate, and a firing step of firing the laminate in a firing atmosphere having an oxygen partial pressure equal to or lower than the equilibrium oxygen partial pressure for Cu—$Cu_2O$.

In still another aspect of the present disclosure, a process for producing a ceramic electronic component includes a calcination step of weighing an Fe compound, an Mn compound, a Cu compound, a Zn compound and an Ni compound precisely in such a manner that a molar content of Cu becomes 0 to 5 mol % in terms of CuO content and, when a molar content (x (mol %)) of Fe in terms of $Fe_2O_3$ content and a molar content (y (mol %)) of Mn in terms of $Mn_2O_3$ content are expressed by a coordinate point (x,y), the coordinate point (x,y) can be located in an area bounded by coordinate points A (25,1), B (47,1), C (47,7.5), D (45,7.5), E (45,10), F (35, 10), G (35,7.5) and H (25,7.5), mixing the weighed compounds together, and calcining the resultant mixture, thereby producing a calcined powder. The process further includes ferrite paste production step of producing a ferrite paste from the calcined powder, a molding production step of placing a metal wire material containing Cu as the main component in a mold, then injecting the ferrite paste into the mold and carrying out a molding treatment to produce a molding, and a firing step of firing the molding in a firing atmosphere having an oxygen partial pressure equal to or lower than the equilibrium oxygen partial pressure for Cu—$Cu_2O$.

DETAILED DESCRIPTION

Figure 1:
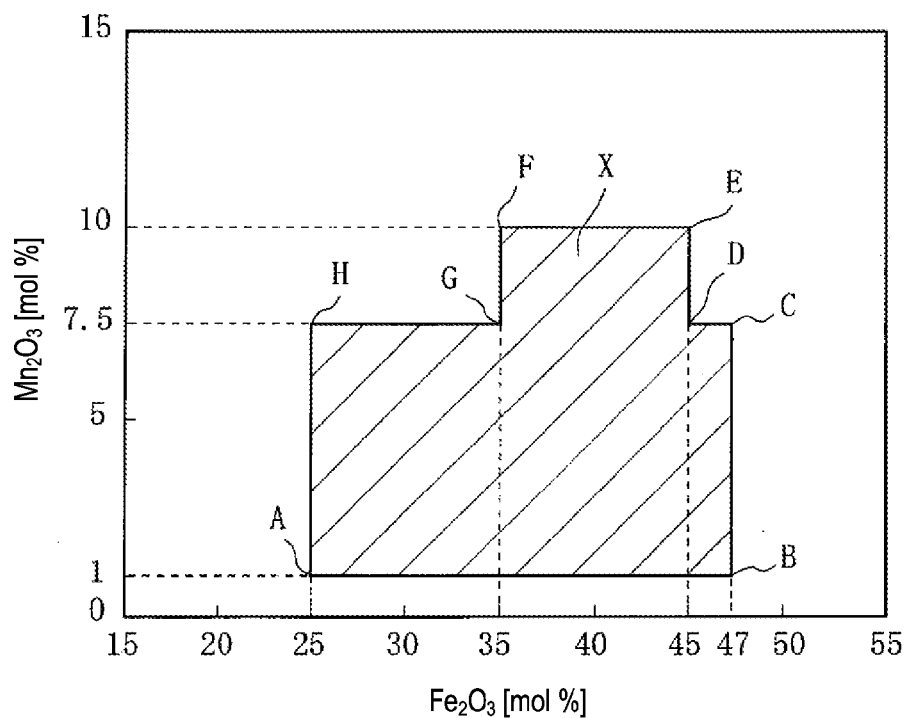
FIG. 1 is a view illustrating the content ranges of $Fe_2O_3$ and $Mn_2O_3$ for the ferrite ceramic composition according to an exemplary embodiment.

In JP 7-22266 A (claim 1, claim 2, paragraph Nos. [0007], [0017], etc.), Ag, Pd, Pt, Ni, Cu, or an alloy of any one of these elements is used. However, when a noble metal material such as Ag, Pd, and Pt is used, such a problem occurs that the material cost is increased and productivity is deteriorated.

Generally, an Ni—Zn-based ferrite is fired in an air atmosphere. However, when a poor metal material such as Ni and Cu is used as a metal wire material, the metal wire material might be oxidized during the firing in an air atmosphere.

Meanwhile, when the ferrite material having the poor metal material embedded therein is fired in a reductive atmosphere for the purpose of avoiding the oxidation of the poor metal material, $Fe_2O_3$ contained in the ferrite material is reduced into $Fe_3O_4$, which might result in the decrease in a specific resistance ρ.

Thus, in a case where Cu is used as a metal wire material and a magnetic material sheet having the metal wire material embedded therein is fired at a temperature of 800° C. or higher, when the firing is performed in an oxidative atmosphere having such an oxygen partial pressure that the state of $Fe_2O_3$ can be maintained, Cu is also oxidized to form $Cu_2O$. On the other hand, when the firing is performed in a reductive atmosphere having such an oxygen partial pressure that the state of metal Cu can be maintained, $Fe_2O_3$ is reduced to form $Fe_3O_4$.

From the relationship between the equilibrium oxygen partial pressure for Cu—$Cu_2O$ and the equilibrium oxygen partial pressure for $Fe_2O_3$—$Fe_2O_4$, it is known that there is not any area in which Cu and $Fe_2O_3$ can coexist at a temperature of 800° C. or higher.

The same is almost true with respect to the relationship between the equilibrium oxygen partial pressure for Ni—NiO and the equilibrium oxygen partial pressure for $Fe_2O_3$—$Fe_3O_4$.

Therefore, in JP 7-22266 A (claim 1, claim 2, paragraph Nos. [0007], [0017], etc.), although the poor metal material such as Cu and Ni and the ferrite material are fired simultaneously in a reductive atmosphere, when the firing is performed in such a reductive atmosphere that the poor metal material is not oxidized, $Fe_2O_3$ is reduced into $Fe_2O_4$ and consequently the specific resistance ρ is decreased, which might result in the deterioration in electric properties including an impedance property, because there is not any area in which the poor metal material and $Fe_2O_3$ can coexist.

The present inventors have made intensive studies on ferrite materials having a spinel-type crystal structure represented by general formula $X_2O_2.MeO$ (wherein X represents Fe or Mn; and Me represents Zn, Cu or Ni). As a result, it is found, when the molar content of CuO is set to 5 mol % or less and the amounts of $Fe_2O_3$ and $Mn_2O_2$ added are limited within specified ranges in the ferrite material, desired good insulation performance can be achieved even if the ferrite material is fired simultaneously with a Cu-based material, and it becomes possible to produce a ceramic electronic component having good electric properties.

As a result of the further intensive studies made by the present inventors, it is found that, although it is preferred to add ZnO to the ferrite magnetic composition for the purpose of achieving more superior properties, the Curie point (Tc) is decreased, the operation at higher temperature cannot be ensured and reliability may be deteriorated when the content of ZnO exceeds 33 mol %.

Exemplary embodiments of the present disclosure that can address the above drawbacks will not be described in detail.

One exemplary embodiment of the ferrite ceramic composition has a spinel-type crystal structure represented by general formula $X_2O_3.MeO$, and contains at least $Fe_2O_3$ and $Mn_2O_3$ which are trivalent element compounds and ZnO and NiO which are bivalent element compounds, and optionally contains CuO which is a bivalent element compound.

Specifically, the ferrite ceramic composition contains CuO at a molar content of 0 to 5 mol %, also contains $Fe_2O_3$ and $Mn_2O_3$ at such molar contents that, when the molar content of $Fe_2O_3$ is expressed by x (mol %), the molar content of $Mn_2O_3$ is expressed by y (mol %) and the molar content of $Fe_2O_3$ and the molar content of $Mn_2O_3$ are expressed by a coordinate point (x,y), the coordinate point (x,y) is located within a shaded area (X) defined by points A to H, as shown in FIG. 1, wherein the remainder is made up by ZnO and NiO.

The coordinate points (x,y) for the coordinate points A to H correspond to the following molar contents: A (25,1), B (47,1), C (47,7.5), D (45,7.5), E (45,10), F (35,10), G (35,7.5), and H (25,7.5).

Next, the reason why the molar contents of CuO, $Fe_2O_3$ and $Mn_2O_2$ are defined within the above-mentioned ranges is described in detail.

(1) the Molar Content of CuO:

With respect to an Ni—Zn-based ferrite, when CuO, which has a melting point of as low as 1,026° C., is added to the ferrite ceramic composition, the ferrite magnetic composition can be fired at a lower temperature and the sintering properties can be improved.

On the other hand, when a Cu-based material containing Cu as the main component and a ferrite material are fired simultaneously, if the firing is performed in an air atmosphere, Cu is oxidized readily to form $Cu_2O$. Therefore, it is required to perform the firing in such a reductive atmosphere that the oxidation of Cu does not occur.

However, when the firing is performed in such a reductive atmosphere, if the molar content of CuO exceeds 5 mol %, CuO in the ferrite raw material is reduced to form $Cu_2O$ and the amount of $Cu_2O$ in the ferrite raw material is increased, which might result in the decrease in a specific resistance ρ.

Then, in the embodiment, the amount of CuO to be added is controlled in such a manner that the molar content of CuO becomes 5 mol % or less, i.e., 0 to 5 mol %.

(2) the Molar Contents of $Fe_2O_3$ and $Mn_2O_3$:

The content of $Fe_2O_3$ in the composition is smaller than the content defined in the stoichiometric composition, and $Mn_2O_2$ is contained by substituting a portion of Fe by Mn, whereby the decrease in a specific resistance ρ can be avoided and insulation performance can be improved.

That is, in the case of a spinel-type crystal structure (general formula $X_2O_2 \cdot MeO$), the ratio of $X_2O_3$ (wherein X: Fe, Mn) to MeO (wherein Me: Ni, Zn, Cu) is 50:50 according to the stoichiometric composition, and $X_2O_3$ and MeO are added at contents substantially defined in the stoichiometric composition.

When a Cu-based material containing Cu as the main component and the ferrite material are fired simultaneously, if the firing is performed in an air atmosphere, Cu is oxidized readily to form $Cu_2O$. Therefore, it is required to perform the firing in such a reductive atmosphere that the oxidation of Cu does not occur. On the other hand, if $Fe_2O_3$, which is the main component of the ferrite material, is fired in a reductive atmosphere, $Fe_3O_4$ is formed. Therefore, with respect to $Fe_2O_3$, it is required to perform the firing in an oxidative atmosphere.

However, as stated above, it is known that there is not any area in which both metal Cu and $Fe_2O_3$ can coexist when the firing is performed at a temperature of 800° C. or higher, from the relationship between the equilibrium oxygen partial pressure for Cu—$Cu_2O$ and the equilibrium oxygen partial pressure for $Fe_3O_4$—$Fe_2O_3$.

Thus, in a temperature region of 800° C. or higher, a reductive atmosphere for $Mn_2O_3$ can be achieved at a higher oxygen partial pressure than that for $Fe_2O_3$. Therefore, at an oxygen partial pressure that is equal to or lower than the equilibrium oxygen partial pressure for Cu—$Cu_2O$, the atmosphere for $Mn_2O_3$ becomes strongly reductive compared that for $Fe_2O_3$. Therefore, the firing can be accomplished while reducing $Mn_2O_3$ preferentially. That is, since $Mn_2O_3$ is reduced preferentially than $Fe_2O_3$, the firing treatment can be accomplished before $Fe_2O_3$ is reduced into $Fe_3O_4$.

As stated above, when the molar content of $Fe_2O_3$ is smaller than that defined in the stoichiometric composition and $Mn_2O_3$, which is a trivalent element compound like $Fe_2O_3$, is added to the ferrite ceramic composition, even if a Cu-based material and the ferrite material are fired simultaneously at an oxygen partial pressure equal to or lower than the equilibrium oxygen partial pressure for Cu—$Cu_2O$, $Mn_2O_3$ is reduced preferentially and, therefore, the sintering can be accomplished before the occurrence of the reduction of $Fe_2O_3$. Therefore, it becomes possible to allow metal Cu and $Fe_2O_3$ to coexist more effectively. As a result, the decrease in a specific resistance ρ can be avoided and insulation performance can be improved.

If the molar content of $Fe_2O_3$ is less than 25 mol %, the molar content of $Fe_2O_3$ is decreased excessively. As a result, the specific resistance ρ is decreased and desired insulation performance cannot be secured any more.

If the molar content of $Mn_2O_3$ is less than 1 mol %, the molar content of $Mn_2O_3$ is reduced excessively, and therefore $Fe_2O_3$ can be reduced into $Fe_3O_4$ more readily. As a result, the specific resistance ρ is decreased and satisfactory insulation performance cannot be secured.

If the molar content of $Fe_2O_3$ exceeds 47 mol %, the molar content of $Fe_2O_3$ becomes excessive. In this case, $Fe_2O_3$ can also be reduced into $Fe_3O_4$ more readily. As a result, the specific resistance ρ is decreased and satisfactory insulation performance cannot be secured.

If the molar content of $Mn_2O_3$ exceeds 10 mol %, a satisfactorily high specific resistance ρ cannot be achieved and insulation performance cannot be secured.

Further, in the case where the molar content of $Fe_2O_3$ is 25 mol % or more but is less than 35 mol %, and in the case where the molar content of $Fe_2O_3$ is 45 mol % or more but less than 47 mol %, if the molar content of $Mn_2O_3$ exceeds 7.5 mol %, the decrease in a specific resistance ρ is caused and desired insulation performance cannot be secured.

Then, in this embodiment, the molar contents of $Fe_2O_3$ and $Mn_2O_3$ are controlled so as to fall within the area bounded by the coordinate points A to H shown in FIG. 1.

In the ferrite ceramic composition, the molar contents of ZnO and NiO are not particularly limited and can be set properly in accordance with the molar contents of $Fe_2O_3$, $Mn_2O_3$ and CuO. Preferably, ZnO and NiO are added in such a manner that the molar content of ZnO becomes 6 to 33 mol % and the remainder is made up by NiO.

If the molar content of ZnO exceeds 33 mol %, the Curie point (Tc) is decreased and the operation at higher temperatures may not be ensured. Therefore, the content of ZnO is preferably 33 mol % or less.

ZnO has an effect of improving a magnetic permeability (μ). For achieving the effect, it is needed to add ZnO at a molar content of 6 mol %.

For the reasons stated above, the molar content of ZnO is preferably 6 to 33 mol %.

As stated above, the ferrite ceramic composition has a molar content of Cu of 0 to 5 mol % in terms of CuO content, and also has such molar contents of Fe and Mn that, when the molar content (x (mol %)) of Fe in terms of $Fe_2O_3$ content and the molar content (y (mol %)) of Mn in terms of $Mn_2O_3$ content are expressed by a coordinate point (x,y), the coordinate point (x,y) is located within an area bounded by the coordinate points A to H. Therefore, when the ferrite ceramic composition is fired simultaneously with a Cu-based material, the specific resistance ρ is not decreased and desired insulation performance can be secured.

Specifically, such good insulation performance that a specific resistance ρ of $10^7$ Ω·cm or more can be achieved. Consequently, it becomes possible to produce a desired ceramic electronic component having good electric properties including an impedance property.

In the ferrite ceramic composition, since the molar content of Zn is 6 to 33 mol % in terms of ZnO content, good magnetic permeability can be achieved and a satisfactory Curie point can be secured. The composition enables the production of a ceramic electronic component which can be operated under conditions including a high operation temperature.

Next, a ceramic electronic component produced using the ferrite ceramic composition is described in detail with reference to FIGS. 2 to 7.

Figure 2:
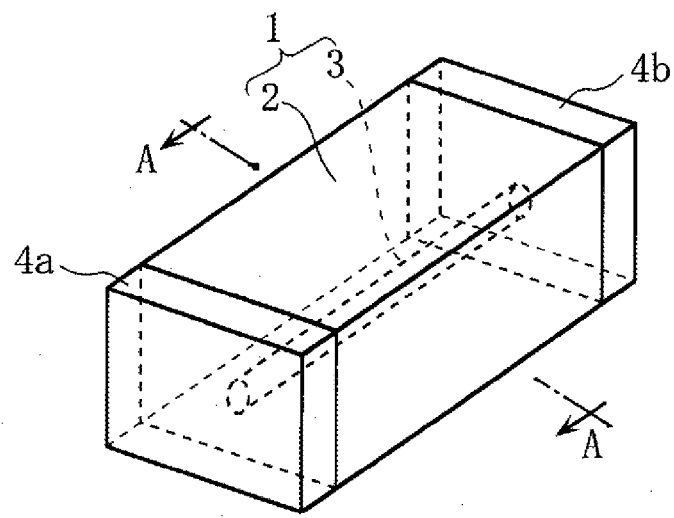
FIG. 2 is a perspective view illustrating an embodiment (a first embodiment) of a chip-type inductor as the ceramic electronic component according an exemplary embodiment.
Figure 3:
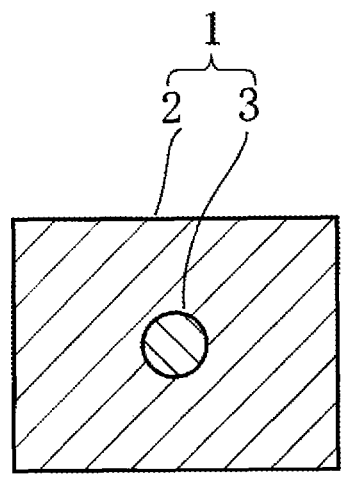
FIG. 3 is a cross sectional view of FIG. 2 taken along line A-A.

FIG. 2 is a perspective view illustrating one exemplary embodiment (a first embodiment) of a laminated inductor as the ceramic electronic component according to the present disclosure, and FIG. 3 is a cross sectional view of FIG. 2 taken along line A-A.

In the laminated inductor, a component body (1) comprises a magnetic body part (2) and a metal wire material (3) embedded in the magnetic body part (2). At both ends of the component body (1), external electrodes (4a, 4b) are formed.

The metal wire material (3) is formed in a linear shape and is embedded in substantially the longitudinal direction center of the magnetic body part (2), and both ends of the metal wire material (3) are electrically connected to the external electrodes (4a, 4b), respectively.

In the first exemplary embodiment, the metal wire material (3) comprises an electrically conductive material containing Cu as the main component, and the magnetic body part (2) comprises the above-mentioned ferrite ceramic composition according to the present disclosure.

By employing this constitution, the oxidation of Cu or the reduction of $Fe_2O_3$ can be avoided. Therefore, a good specific resistance ρ can be secured and a laminated inductor having desired good electric properties can be produced.

Specifically, the specific resistance ρ can be improved to $10^7$ Ω·cm or more, and a laminated inductor that has a high impedance value in a specific frequency range and is suitable for the absorption of noises can be produced.

Figure 4:
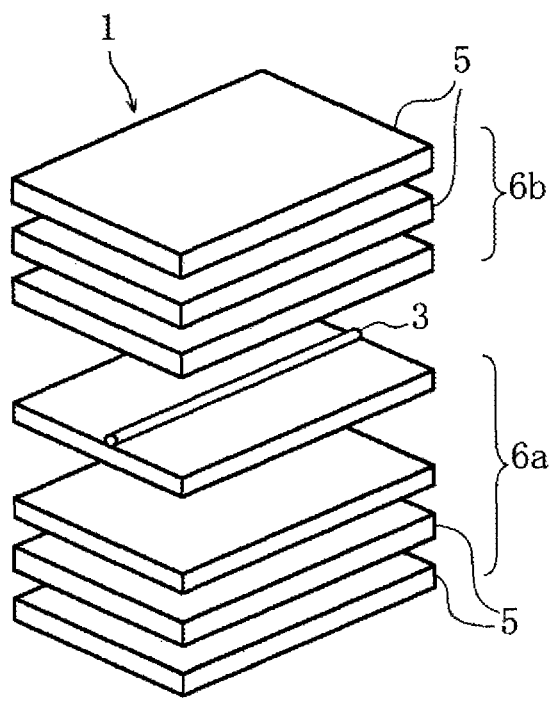
FIG. 4 is an exploded perspective view illustrating the main part of the first exemplary embodiment.

FIG. 4 is an exploded perspective view of the component body (1), and an exemplary process for producing the laminated inductor is now described in detail with reference thereto.

First, $Fe_2O_3$, ZnO, NiO, and optionally CuO are provided as the ceramic raw materials. The ceramic raw materials are weighed precisely so as to have a CuO content of 0 to 5 mol % and such $Fe_2O_3$ and $Mn_2O_3$ contents that the contents of $Fe_2O_3$ and $Mn_2O_3$ fulfill the specified area bounded by the coordinate points A to H of FIG. 1.

Subsequently, the precisely weighed materials are introduced into a pot mill together with pure water and cobbled stones such as PSZ (partially stabilized zirconia) balls, the mixture is fully mixed and milled in a wet mode, and the milled product is evaporated to dryness and then calcined at a temperature of 700 to 800° C. for a predetermined time.

Subsequently, the calcined powder is introduced into the pot mill again together with an organic binder such as polyvinyl butyral, an organic solvent such as ethanol, and toluene and PSZ balls, and the resultant mixture is fully mixed and milled, thereby producing a ceramic slurry.

Subsequently, the ceramic slurry is molded into a sheet-like form employing a doctor blade method or the like, thereby producing a magnetic ceramic green sheet (a ceramic thin layer body; simply referred to as "a magnetic material sheet", hereinafter) (5) having a predetermined thickness.

Subsequently, multiple pieces of the multiple magnetic material sheets (5) are laminated on each other to form a first magnetic material layer (6a), and a metal wire material (3) having a diameter of about 50 to 100 μm is arranged on the upper surface of the first magnetic material layer (6a) in parallel with the side surfaces of the first magnetic material layer (6a) at substantially the center parts of the both end surfaces. On the first magnetic material layer (6a) and the metal wire material (3), multiple pieces of the multiple magnetic material sheets (5) are laminated, thereby forming a second magnetic material layer (6b). The resultant laminate is pressurized and compressed, and is then cut into a predetermined size, thereby producing a laminated molding.

Subsequently, the laminated molding is fully defatted by heating in an atmosphere that does not cause the oxidation of Cu. The defatted laminated molding is fed into a firing furnace of which the atmosphere has been controlled with an $N_2$—$H_2$—$H_2O$ mixed gas so as to have an oxygen partial pressure equal to or lower than the equilibrium oxygen partial pressure for Cu—$Cu_2O$, and is then fired at 900 to 1,050° C. for a predetermined time, thereby producing a component body (1) in which the metal wire material (3) is embedded in the magnetic body part (2).

Subsequently, an electrically conductive paste for external electrodes which contains Cu or the like as the main component is applied to both ends of the component body (1). The electrically conductive paste is dried and then baked at 900° to form external electrodes (4a, 4b). In this manner, the above-mentioned laminated inductor can be produced.

As mentioned above, the first embodiment comprises: a calcination step of weighing an Fe compound, an Mn compound, a Cu compound, a Zn compound and an Ni compound precisely in such a manner that the molar content of Cu becomes 0 to 5 mol % in terms of CuO content and, when the molar content (x (mol %)) of Fe in terms of $Fe_2O_3$ content and the molar content (y (mol %)) of Mn in terms of $Mn_2O_3$ content are expressed by a coordinate point (x,y), the coordinate point (x,y) can be located in the specified area bounded by coordinate points A to H (see FIG. 1), mixing the weighed compounds together, and calcining the resultant mixture, thereby producing a calcined powder; a magnetic material sheet production step of producing magnetic material sheets (5) from the calcined powder; a laminate formation step of laminating multiple pieces of the magnetic material sheets (5) on each other in such a manner that a metal wire material (3) containing Cu as the main component and having a linear shape is intercalated between at least a pair of the magnetic material sheets (5), thereby forming a laminate; and a firing step of firing the laminate in a firing atmosphere having an oxygen partial pressure equal to or lower than the equilibrium oxygen partial pressure for Cu—$Cu_2O$. Therefore, even when the ceramic material is fired under a firing atmosphere having an oxygen partial pressure equal to or lower than the equilibrium oxygen partial pressure for Cu—$Cu_2O$ together with the linear metal wire material (3) containing Cu as the main component, it becomes possible to produce an inductor having good insulation performance and good electric properties without undergoing the oxidation of Cu or the reduction of Fe.

Figure 5:
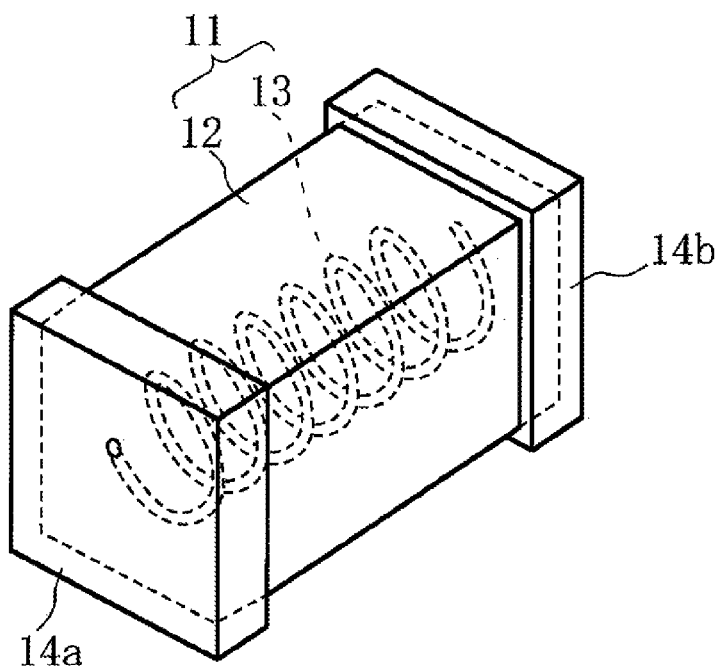
FIG. 5 is a perspective view illustrating a second exemplary embodiment of a chip-type inductor as a ceramic electronic component.
Figure 6:
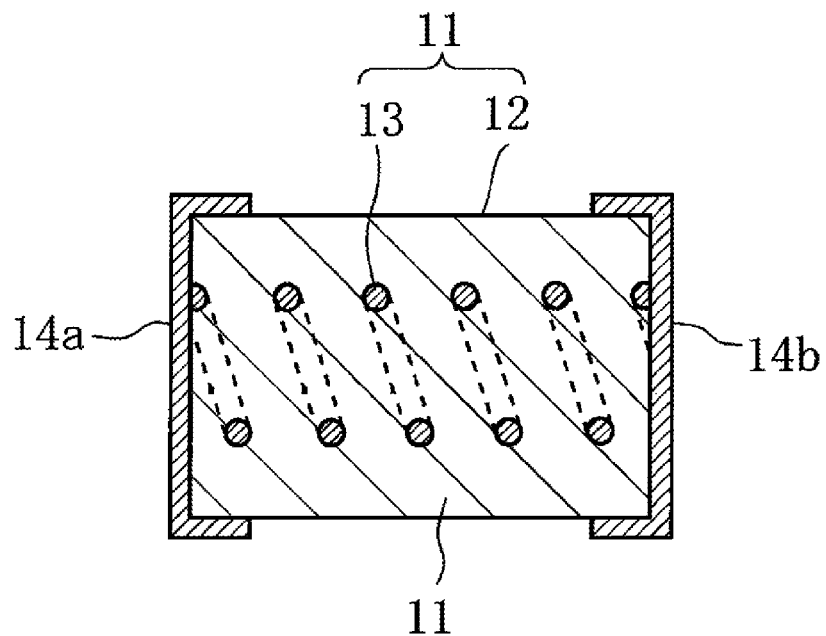
FIG. 6 is a vertical sectional view of FIG. 5.

FIG. 5 is a perspective view illustrating an inductor which is a second exemplary embodiment of a ceramic electronic component according to the present disclosure, and FIG. 6 is a cross sectional view of FIG. 5.

The inductor is substantially the same as the first exemplary embodiment, and the component body (11) comprises a magnetic body part (12) and a metal wire material (13) embedded in the magnetic body part (12). At both ends of the component body (11), external electrodes (14a, 14b) are formed.

That is, the metal wire material (13) is formed in a spiral shape and is embedded in substantially the longitudinal direction center of the magnetic body part (12), and both ends of the metal wire material (13) are electrically connected to the external electrodes (14a, 14b), respectively.

In the second exemplary embodiment, since the metal wire material (13) has a spiral shape, it becomes possible to produce an inductor having a higher inductance value compared with that of the first embodiment in which a metal wire material having a linear shape is used.

In the second exemplary embodiment, the metal wire material (13) is also composed of an electrically conductive material containing Cu as the main component and the magnetic body part (12) is also composed of the above-mentioned ferrite ceramic composition according to the present disclosure. By employing this constitution, even when the magnetic body part (12) is fired in such a state that the metal wire material (13) is embedded in the magnetic body part (12), the occurrence of the oxidation of Cu or the reduction of $Fe_2O_3$ can be avoided and therefore a good specific resistance $\rho$ can be secured. Therefore, it becomes possible to produce a ceramic electronic component having desired good electric properties.

Next, the process for producing the inductor is described in detail.

First, a calcined power is produced by the same methods and procedures as those employed in the first embodiment.

Subsequently, the calcined powder is mixed with an organic vehicle comprising a resin such as an ethyl cellulose resin and an organic solvent such as terpineol, and the mixture is kneaded using a triple ball mill, thereby producing a ferrite paste.

Subsequently, a molding treatment is performed using a mold.

Figure 7:
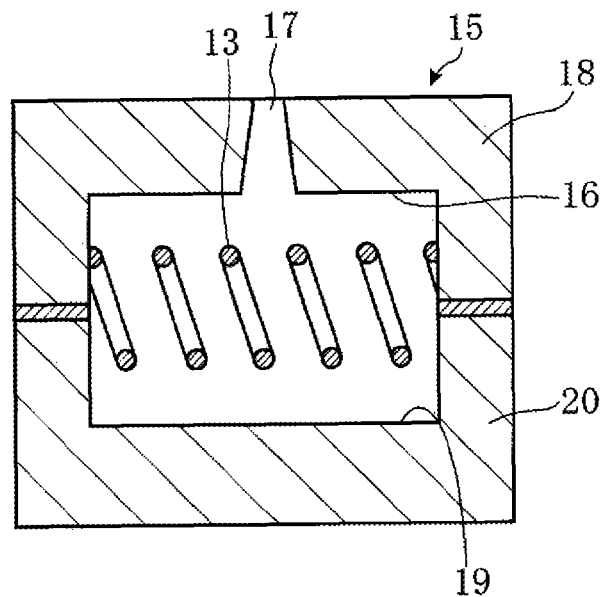
FIG. 7 is a cross sectional view illustrating the main part of the production process of the second exemplary embodiment.

FIG. 7 is a cross sectional view of a molding apparatus. That is, the molding apparatus (15) comprises an upper mold (18) having a first cavity (16) and a paste injection port (17) and a lower mold (20) having a second cavity (19).

A metal wire material (13) containing Cu as the main component and shaped into a spiral form is latched in a support groove (not shown) in the lower mold (20) to tightly adhere the metal wire material (13) between the upper mold (20) and the lower mold (20), the ferrite paste is injected through the paste injection port (17), the molding apparatus (15) is heated while applying a pressure to evaporate and remove the organic solvent, thereby producing a molding.

Subsequently, the molding is removed from the molding apparatus (15). The molding is fully defatted by heating under an atmosphere that does not cause the oxidation of Cu, is then fed into a firing furnace of which the atmosphere has been adjusted with an $N_2$—$H_2$—$H_2O$ mixed gas so as to have an oxygen partial pressure equal to or lower than the equilibrium oxygen partial pressure for Cu—$Cu_2O$, and is then fired at 900 to 1,050° C. for a predetermined time. In this manner, a component body (11) in which the metal wire material (13) is embedded in the magnetic body part (12) can be produced.

Subsequently, an electrically conductive paste for external electrodes which contains Cu or the like as the main component is applied to both ends of the component body (11), is dried, and is then baked at 900° C., thereby forming external electrodes (14a, 14b). In this manner, the above-mentioned inductor can be produced.

In the second exemplary embodiment, substantially like the first embodiment, even when the ferrite material is fired under a firing atmosphere having an oxygen partial pressure equal to or lower than the equilibrium oxygen partial pressure for Cu—$Cu_2O$ together with the spiral-shaped metal wire material (13) containing Cu as the main component, the oxidation of Cu or the reduction of Fe does not occur. Therefore, it becomes possible to produce an inductor having good insulation performance and good electric properties.

The present disclosure is not limited to the above-mentioned embodiments. For example, in the first exemplary embodiment, although the ceramic green sheet (5) is produced from a calcined powder, any other ceramic thin layer body may also be used. For example, a magnetic coating film may be formed on a PET film by a printing treatment.

Further, in the second exemplary embodiment, although a metal wire material (13) having a spiral shape is used, the shape of the metal wire material (13) is not particularly limited and a prismatic shape, a flattened shape or the like, of course, may also be employed.

As a matter of course, the ferrite ceramic composition according to the present disclosure can be used for various types of inductors, can also be used widely for use applications in which the ferrite ceramic composition is fired simultaneously with an electrically conductive material containing Cu as the main component, and can also be used for other ceramic electronic components.

More specific examples of the present disclosure will now be described.

EXAMPLE 1

$Fe_2O_3$, $Mn_2O_3$, ZnO, CuO and NiO were provided as ceramic raw materials, and the ceramic raw materials were weighed precisely so that the molar contents of the ceramic raw materials became those shown in Tables 1 to 3. That is, the ceramic raw materials were weighed precisely in such a manner that the contents of ZnO and CuO were fixed to 30 mol % and 1 mol %, respectively, the molar content of each of $Fe_2O_3$ and $Mn_2O_3$ was varied and the remainder was made up by NiO.

Next, the precisely weighed materials were placed in a pot mill made of vinyl chloride together with pure water and PSZ balls, the mixture was fully mixed and milled in a wet mode, the resultant mixture was evaporated to dryness, and the dried product was calcined at 750° C., thereby producing a calcined powder.

Subsequently, the calcined powder was placed again in the pot mill made of vinyl chloride together with a polyvinyl butyral binder (an organic binder), ethanol (an organic solvent) and PSZ balls, and the mixture was fully mixed and milled, thereby producing a ceramic slurry.

Subsequently, the ceramic slurry was shaped into a sheet-like form having a thickness of 25 μm employing a doctor blade method, and the sheet-like material was then punched out into a size of 50 mm in length and 50 mm in width. In this manner, a magnetic material sheet was produced.

Subsequently, multiple pieces of the magnetic material sheets thus produced were laminated in such a manner that the total thickness became 1.0 mm, the resultant laminate was heated to 60° C., then compressed for 60 seconds at a pressure of 100 MPa, and then punched out into a ring shape having an outer diameter of 20 mm and an inner diameter of 12 mm. In this manner, a ceramic molding was produced.

Subsequently, the resultant ceramic molding was fully defatted by heating. An $N_2$—$H_2$—$H_2O$ mixed gas was fed to a firing furnace to adjust the oxygen partial pressure in the firing furnace to $6.7 \times 10^{-2}$ Pa, and then the ceramic molding was introduced into the firing furnace and fired at 1,000° C. for 2 hours. In this manner, a ring-shaped sample was produced.

The oxygen partial pressure of $6.7 \times 10^{-2}$ Pa is the equilibrium oxygen partial pressure for Cu—$Cu_2O$ at 1,000° C. The ceramic molding was fired for 2 hours under the equilibrium oxygen partial pressure for Cu—$Cu_2O$. In this manner, ring-shaped samples Nos. 1 to 104 were produced.

A soft copper wire was wound around each of the ring-shaped samples Nos. 1 to 104 20 turns, the inductance of the resultant product was measured at a measurement frequency of 1 MHz using an impedance analyzer (Agilent Technologies, E4991A), and a magnetic permeability (μ) was determined from the measurement value.

Subsequently, an organic vehicle comprising terpineol (an organic solvent) and an ethyl cellulose resin (a binder resin) was mixed with a Cu powder, and the mixture was kneaded with a triple roll mill. In this manner, a Cu paste was produced.

Subsequently, the Cu paste was screen-printed on the surface of the magnetic material sheet, thereby producing an electrically conductive film having a predetermined pattern on the magnetic material sheet. A predetermined number of the magnetic material sheets each having the electrically conductive film formed thereon were laminated in a predetermined order. The resultant laminate was intercalated between the magnetic material sheets on each of which the electrically conductive film was not formed, and the resultant laminate was compressed and then cut into a predetermined size. In this manner, a laminated molding was produced.

Subsequently, the laminated molding was defatted sufficiently, an $N_2$—$H_2$—$H_2O$ mixed gas was fed to a firing furnace to adjust the oxygen partial pressure in the firing furnace to $6.7 \times 10^{-2}$ Pa (the equilibrium oxygen partial pressure for Cu—$Cu_2O$ at 1,000° C.). The laminated molding was introduced into the firing furnace, and was then fired at 1,000° C. for 2 hours. In this manner, a sintered ceramic body having an internal electrode embedded therein was produced.

Subsequently, the sintered ceramic body was introduced into a pot together with water, and the sintered ceramic body was subjected to a barrel treatment using a centrifugal barrel machine. In this manner, a ceramic body was produced.

An electrically conductive paste for external electrodes which contains Cu or the like as the main component, was applied to both ends of the ceramic body, and was then dried. The resultant product was subjected to a baking treatment at 750° C. in a firing furnace of which the oxygen partial pressure was adjusted to $4.3 \times 10^{-3}$ Pa. In this manner, samples for specific resistance measurement Nos. 1 to 104 were produced. In this example, the oxygen partial pressure of $4.3 \times 10^{-3}$ Pa is the equilibrium oxygen partial pressure for Cu—$Cu_2O$ at 750° C.

Each of the specific resistance measurement samples had an outer size of 3.0 mm in length, 3.0 mm in width and 1.0 mm in thickness.

Figure 8:
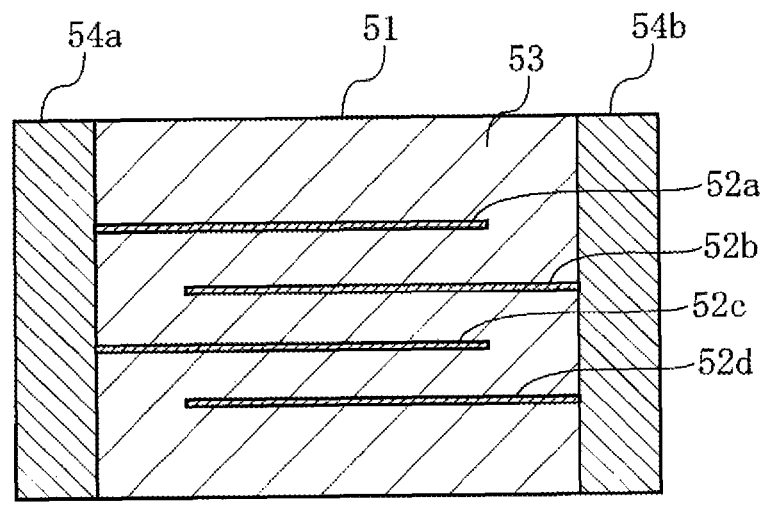
FIG. 8 is a cross sectional view of a sample for use in the specific resistance measurement, which is produced in Example 1.

FIG. 8 is a cross sectional view of each of the specific resistance measurement samples. In the ceramic body (51), internal electrodes (52a to 52d) were embedded in the magnetic material layer (53) in such a manner that the extraction sections were arranged in a staggered configuration, and external electrodes (54a, 54b) were formed at both ends of the ceramic body (51).

Subsequently, with respect to the specific resistance measurement samples Nos. 1 to 104, a voltage of 50 V was applied to each of the external electrodes (54a, 54b) for 30 seconds, and a current generated upon the application of the voltage was measured. A resistivity was calculated from the measurement value, and a logarithm log ρ for a specific resistance (referred to as "a specific resistance log ρ," hereinafter) was calculated from the outer size of each of the samples.

In Tables 1 to 3, the ferrite compositions and the measurement results for samples Nos. 1 to 104 are shown.

TABLE 1

| Sample No. | Ferrite composition (mol %) | | | | | Electric properties | |
|---|---|---|---|---|---|---|---|
| | | | | | | Specific resistance log ρ, | Magnetic permeability |
| | $Fe_2O_3$ | $Mn_2O_3$ | ZnO | CuO | NiO | ρ: Ω · cm | μ (−) |
| 1* | 49 | 0 | 30 | 1 | 20 | 2.8 | 350 |
| 2* | 49 | 1 | 30 | 1 | 19 | 3.3 | 400 |
| 3* | 49 | 2 | 30 | 1 | 18 | 3.4 | 600 |
| 4* | 49 | 5 | 30 | 1 | 15 | 3.4 | 750 |
| 5* | 49 | 7.5 | 30 | 1 | 12.5 | 3.4 | 900 |
| 6* | 49 | 10 | 30 | 1 | 10 | 3.4 | 1100 |
| 7* | 49 | 13 | 30 | 1 | 7 | 3.3 | 1250 |
| 8* | 49 | 15 | 30 | 1 | 5 | 3.1 | 1450 |
| 9* | 48 | 0 | 30 | 1 | 21 | 4.4 | 290 |
| 10* | 48 | 1 | 30 | 1 | 20 | 5.9 | 330 |
| 11* | 48 | 2 | 30 | 1 | 19 | 6.3 | 500 |
| 12* | 48 | 5 | 30 | 1 | 16 | 6.1 | 640 |
| 13* | 48 | 7.5 | 30 | 1 | 13.5 | 5.9 | 760 |
| 14* | 48 | 10 | 30 | 1 | 11 | 5.6 | 900 |
| 15* | 48 | 13 | 30 | 1 | 8 | 5 | 1050 |
| 16* | 48 | 15 | 30 | 1 | 6 | 4.3 | 1250 |
| 17* | 47 | 0 | 30 | 1 | 22 | 5.3 | 235 |
| 18 | 47 | 1 | 30 | 1 | 21 | 7 | 260 |
| 19 | 47 | 2 | 30 | 1 | 20 | 7.5 | 400 |
| 20 | 47 | 5 | 30 | 1 | 17 | 7.3 | 520 |
| 21 | 47 | 7.5 | 30 | 1 | 14.5 | 7 | 625 |
| 22* | 47 | 10 | 30 | 1 | 12 | 6.4 | 750 |
| 23* | 47 | 13 | 30 | 1 | 9 | 5.6 | 880 |
| 24* | 47 | 15 | 30 | 1 | 7 | 4.9 | 1050 |
| 25* | 46 | 0 | 30 | 1 | 23 | 5.9 | 195 |
| 26 | 46 | 1 | 30 | 1 | 22 | 7.4 | 215 |
| 27 | 46 | 2 | 30 | 1 | 21 | 7.6 | 320 |
| 28 | 46 | 5 | 30 | 1 | 18 | 7.5 | 430 |
| 29 | 46 | 7.5 | 30 | 1 | 15.5 | 7.3 | 520 |
| 30* | 46 | 10 | 30 | 1 | 13 | 6.8 | 630 |
| 31* | 46 | 13 | 30 | 1 | 10 | 6 | 730 |
| 32* | 46 | 15 | 30 | 1 | 8 | 5.2 | 880 |
| 33* | 45 | 0 | 30 | 1 | 24 | 6.2 | 165 |
| 34 | 45 | 1 | 30 | 1 | 23 | 7.7 | 180 |
| 35 | 45 | 2 | 30 | 1 | 22 | 7.9 | 250 |
| 36 | 45 | 5 | 30 | 1 | 19 | 7.8 | 340 |
| 37 | 45 | 7.5 | 30 | 1 | 16.5 | 7.6 | 420 |
| 38 | 45 | 10 | 30 | 1 | 14 | 7.1 | 520 |
| 39* | 45 | 13 | 30 | 1 | 11 | 6.3 | 600 |
| 40* | 45 | 15 | 30 | 1 | 9 | 5.4 | 720 |

*out of the scope of the disclosure (claim 1)

TABLE 2

| Sample No. | Ferrite composition (mol %) | | | | | Electric properties | |
|---|---|---|---|---|---|---|---|
| | | | | | | Specific resistance log ρ | Magnetic permeability |
| | $Fe_2O_3$ | $Mn_2O_3$ | ZnO | CuO | NiO | ρ: Ω·cm | μ (–) |
| 41* | 44 | 0 | 30 | 1 | 25 | 6.4 | 145 |
| 42 | 44 | 1 | 30 | 1 | 24 | 7.9 | 155 |
| 43 | 44 | 2 | 30 | 1 | 23 | 8 | 210 |
| 44 | 44 | 5 | 30 | 1 | 20 | 8 | 280 |
| 45 | 44 | 7.5 | 30 | 1 | 17.5 | 7.8 | 340 |
| 46 | 44 | 10 | 30 | 1 | 15 | 7.3 | 420 |
| 47* | 44 | 13 | 30 | 1 | 12 | 6.5 | 490 |
| 48* | 44 | 15 | 30 | 1 | 10 | 5.7 | 590 |
| 49* | 42 | 0 | 30 | 1 | 27 | 6.6 | 115 |
| 50 | 42 | 1 | 30 | 1 | 26 | 7.9 | 125 |
| 51 | 42 | 2 | 30 | 1 | 25 | 8.2 | 160 |
| 52 | 42 | 5 | 30 | 1 | 22 | 8.2 | 205 |
| 53 | 42 | 7.5 | 30 | 1 | 19.5 | 7.9 | 235 |
| 54 | 42 | 10 | 30 | 1 | 17 | 7.5 | 280 |
| 55* | 42 | 13 | 30 | 1 | 14 | 6.7 | 340 |
| 56* | 42 | 15 | 30 | 1 | 12 | 5.9 | 420 |
| 57* | 40 | 0 | 30 | 1 | 29 | 6.5 | 100 |
| 58 | 40 | 1 | 30 | 1 | 28 | 7.9 | 108 |
| 59 | 40 | 2 | 30 | 1 | 27 | 8 | 130 |
| 60 | 40 | 5 | 30 | 1 | 24 | 8 | 160 |
| 61 | 40 | 7.5 | 30 | 1 | 21.5 | 7.8 | 185 |
| 62 | 40 | 10 | 30 | 1 | 19 | 7.3 | 215 |
| 63* | 40 | 13 | 30 | 1 | 16 | 6.5 | 260 |
| 64* | 40 | 15 | 30 | 1 | 14 | 5.8 | 320 |
| 65* | 35 | 0 | 30 | 1 | 34 | 6.1 | 80 |
| 66 | 35 | 1 | 30 | 1 | 33 | 7.7 | 85 |
| 67 | 35 | 2 | 30 | 1 | 32 | 8 | 94 |
| 68 | 35 | 5 | 30 | 1 | 29 | 8 | 110 |
| 69 | 35 | 7.5 | 30 | 1 | 26.5 | 7.5 | 125 |
| 70 | 35 | 10 | 30 | 1 | 24 | 7 | 150 |
| 71* | 35 | 13 | 30 | 1 | 21 | 6.2 | 180 |
| 72* | 35 | 15 | 30 | 1 | 19 | 5.7 | 235 |
| 73* | 30 | 0 | 30 | 1 | 39 | 5.7 | 65 |
| 74 | 30 | 1 | 30 | 1 | 38 | 7.3 | 69 |
| 75 | 30 | 2 | 30 | 1 | 37 | 7.7 | 75 |
| 76 | 30 | 5 | 30 | 1 | 34 | 7.4 | 85 |
| 77 | 30 | 7.5 | 30 | 1 | 31.5 | 7.1 | 95 |
| 78* | 30 | 10 | 30 | 1 | 29 | 6.7 | 110 |
| 79* | 30 | 13 | 30 | 1 | 26 | 6 | 130 |
| 80* | 30 | 15 | 30 | 1 | 24 | 5.3 | 175 |

*out of the scope of the disclosure (claim 1)

TABLE 3

| Sample No. | Ferrite composition (mol %) | | | | | Electric properties | |
|---|---|---|---|---|---|---|---|
| | | | | | | Specific resistance log ρ | Magnetic permeability |
| | $Fe_2O_3$ | $Mn_2O_3$ | ZnO | CuO | NiO | ρ: Ω·cm | μ (–) |
| 81* | 25 | 0 | 30 | 1 | 44 | 5.2 | 51 |
| 82 | 25 | 1 | 30 | 1 | 43 | 7 | 54 |
| 83 | 25 | 2 | 30 | 1 | 42 | 7.3 | 59 |
| 84 | 25 | 5 | 30 | 1 | 39 | 7.1 | 67 |
| 85 | 25 | 7.5 | 30 | 1 | 36.5 | 7 | 73 |
| 86* | 25 | 10 | 30 | 1 | 34 | 6.4 | 88 |
| 87* | 25 | 13 | 30 | 1 | 31 | 5.6 | 105 |
| 88* | 25 | 15 | 30 | 1 | 29 | 4.9 | 140 |
| 89* | 20 | 0 | 30 | 1 | 49 | 4.6 | 35 |
| 90* | 20 | 1 | 30 | 1 | 48 | 6.2 | 38 |
| 91* | 20 | 2 | 30 | 1 | 47 | 6.7 | 42 |
| 92* | 20 | 5 | 30 | 1 | 44 | 6.3 | 50 |
| 93* | 20 | 7.5 | 30 | 1 | 41.5 | 5.9 | 55 |
| 94* | 20 | 10 | 30 | 1 | 39 | 5.6 | 70 |
| 95* | 20 | 13 | 30 | 1 | 36 | 5 | 87 |
| 96* | 20 | 15 | 30 | 1 | 34 | 4.4 | 120 |
| 97* | 15 | 0 | 30 | 1 | 54 | 3.9 | 18 |
| 98* | 15 | 1 | 30 | 1 | 53 | 5.4 | 20 |
| 99* | 15 | 2 | 30 | 1 | 52 | 5.8 | 25 |
| 100* | 15 | 5 | 30 | 1 | 49 | 5.4 | 33 |
| 101* | 15 | 7.5 | 30 | 1 | 46.5 | 5 | 40 |
| 102* | 15 | 10 | 30 | 1 | 44 | 4.5 | 55 |
| 103* | 15 | 13 | 30 | 1 | 41 | 3.8 | 70 |
| 104* | 15 | 15 | 30 | 1 | 39 | 3.2 | 100 |

*out of the scope of the disclosure (claim 1)

With respect to each of samples Nos. 1 to 17, 22 to 25, 30 to 33, 39 to 41, 47 to 49, 55 to 57, 63 to 65, 71 to 73, 78 to 81 and 86 to 104, the specific resistance log ρ was as small as less than 7 and desired insulation performance could not be achieved, since the composition was located in the outside of the shaded area (X) in FIG. 1.

On the contrary, with respect to each of samples Nos. 18 to 21, 26 to 29, 34 to 38, 42 to 46, 50 to 54, 58 to 62, 66 to 70, 74 to 77 and 82 to 85, it was found that the specific resistance log ρ was 7 or more, good insulation performance could be achieved, and a practically satisfactory level of magnetic permeability (μ), i.e., 50 or more, could be achieved, since the composition was located within the shaded area (X) in FIG. 1.

EXAMPLE 2

Ceramic raw materials were weighed precisely in such a manner that the molar content of $Fe_2O_3$ was 44 mol % and the molar content of $Mn_2O_3$ was 5 mol % (which fall within the ranges defined in the present disclosure), the molar content of ZnO was 30 mol %, the molar content of CuO was varied, and the remainder was made up by NiO, as shown in Table 4. Except for this matter, the same methods and procedures as in Example 1 were performed, thereby producing ring-shaped samples Nos. 201 to 209 and specific resistance measurement samples Nos. 201 to 209.

Subsequently, with respect to samples Nos. 201 to 209, specific resistance log ρ and magnetic permeability were determined by the same method and procedures as in Example 1.

In Table 4, the ferrite compositions and the measurement results for Sample Nos. 201 to 209 are shown.

TABLE 4

| Sample No. | Ferrite composition (mol %) | | | | | Electric properties | |
|---|---|---|---|---|---|---|---|
| | | | | | | Specific resistance log ρ | Magnetic permeability |
| | $Fe_2O_3$ | $Mn_2O_3$ | ZnO | CuO | NiO | ρ: Ω·cm | ρ (–) |
| 201 | 44 | 5 | 30 | 0 | 21 | 7.8 | 210 |
| 202 | 44 | 5 | 30 | 1 | 20 | 8 | 280 |
| 203 | 44 | 5 | 30 | 2 | 19 | 8.2 | 310 |
| 204 | 44 | 5 | 30 | 3 | 18 | 7.9 | 325 |
| 205 | 44 | 5 | 30 | 4 | 17 | 7.5 | 310 |
| 206 | 44 | 5 | 30 | 5 | 16 | 7.1 | 315 |
| 207* | 44 | 5 | 30 | 6 | 15 | 6.1 | 320 |
| 208* | 44 | 5 | 30 | 7 | 14 | 4.9 | 300 |
| 209* | 44 | 5 | 30 | 8 | 13 | 4.1 | 305 |

*out of the scope of the disclosure (claim 1)

With respect to each of samples Nos. 207 to 209, the specific resistance log ρ was as small as less than 7 and desired insulation performance could not be achieved, since the molar content of CuO exceeded 5 mol %.

On the contrary, with respect to each of samples Nos. 201 to 206, such good results were obtained that the specific resistance log ρ was 7 or more, good insulation performance could be achieved, and the magnetic permeability (μ) was 210 or more, since the molar content of CuO was 0 to 5 mol % which falls within the range defined in the present disclosure.

EXAMPLE 3

The same methods and procedures as in Example 1 were performed, except that ceramic raw materials were weighed precisely in such a manner that the molar content of $Fe_2O_3$ was 44 mol %, the molar content of $Mn_2O_3$ was 5 mol % and the molar content of CuO was 1 mol % (which fall within the ranges defined in the present disclosure), the molar content of ZnO was varied, and the remainder was made up by NiO, as shown in Table 5. In this manner, ring-shaped samples Nos. 301 to 309 and specific resistance measurement samples Nos. 301 to 309 were produced.

With respect to each of samples Nos. 301 to 309, a specific resistance log ρ and a magnetic permeability were determined by the same methods and procedures as in Example 1.

With respect to each of samples Nos. 301 to 309, the temperature dependency of saturation magnetization was determined by applying a magnetic field of 1 T (tesla) using a vibrating sample magnetometer (Toei Industry Co., Ltd.; model VSM-5-15). A Curie point (Tc) was determined from the result of the temperature dependency of saturation magnetization.

In Table 5, the ferrite compositions and the measurement results for Sample Nos. 301 to 309 are shown.

TABLE 5

| | | | | | | Electric properties | | |
| --- | --- | --- | --- | --- | --- | --- | --- | --- |
| Sample | Ferrite composition (mol %) | | | | | Specific resistance logρ, ρ: | Magnetic permeability | Curie point Tc |
| No. | $Fe_2O_3$ | $Mn_2O_3$ | ZnO | CuO | NiO | Ω·cm | μ (—) | (° C.) |
| 301*** | 44 | 5 | 1 | 1 | 49 | 7.1 | 15 | 550 |
| 302*** | 44 | 5 | 3 | 1 | 47 | 7.3 | 20 | 515 |
| 303 | 44 | 5 | 6 | 1 | 44 | 7.4 | 35 | 465 |
| 304 | 44 | 5 | 10 | 1 | 40 | 7.6 | 55 | 420 |
| 305 | 44 | 5 | 15 | 1 | 35 | 7.6 | 110 | 340 |
| 306 | 44 | 5 | 25 | 1 | 25 | 7.7 | 230 | 275 |
| 307 | 44 | 5 | 30 | 1 | 20 | 8 | 300 | 165 |
| 308 | 44 | 5 | 33 | 1 | 17 | 8.1 | 355 | 130 |
| 309** | 44 | 5 | 35 | 1 | 15 | 8 | 400 | 110 |

**out of the scope of the disclosure (claim 2)
***out of the scope of the disclosure (claim 3)

With respect to sample No. 309, it was found that the Curie point (Tc) was 110° C. which was lower than those of other samples since the molar content of ZnO exceeded 33 mol %, although the specific resistance log ρ and the magnetic permeability (μ) were satisfactory.

With respect to each of samples Nos. 301 and 302, the magnetic permeability (μ) was decreased to 20 or less since the molar content of ZnO was less than 6 mol %, although the specific resistance log ρ and the Curie point (Tc) were satisfactory.

On the contrary, with respect to each of samples Nos. 303 to 308, it was found that the Curie point (Tc) was 130° C. or higher and therefore the operation under high temperatures around 130° C. was ensured, and the magnetic permeability (μ) was 35 or more which was practically applicable, since the molar content of ZnO was 6 to 33 mol %.

From the above-mentioned results, it was confirmed that the magnetic permeability (μ) was increased when the molar content of ZnO was increased and the Curie point (Tc) was decreased when the molar content of ZnO was increased to be in excess.

EXAMPLE 4

Two types of laminated inductors (samples Nos. 1' and 27') were produced respectively using two types of magnetic material sheets, i.e., magnetic material sheets each having the same composition as that of sample No. 1 produced in Example 1 and magnetic material sheets each having the same composition as that of sample No. 27 produced in Example 1. (See FIGS. 2 to 4).

That is, magnetic material sheets each having the same composition as that of sample No. 1 and magnetic material sheets each having the same composition as that of sample No. 27 were prepared. With respect to each type of the magnetic material sheets, the magnetic material sheets were laminated together to form a first magnetic material layer. On the upper surface of the first magnetic material layer, a Cu wire having a diameter of 100 μm was placed on substantially the center of the first magnetic material layer in parallel with the side surface of the first magnetic material layer. On the surface of the first magnetic material layer having the Cu wire placed thereon, multiple pieces of the magnetic material sheets were laminated to form a second magnetic material layer. Subsequently, the resultant product was heated to 60° C., and was then compressed by applying a pressure of 100 MPa for 60 seconds. The compressed product was cut into a predetermined size, thereby forming a laminated molding.

Subsequently, the laminated molding was fully defatted at a temperature of 600° C. in an atmosphere of which the oxygen partial pressure was adjusted to $1.0 \times 10^{-15}$ Pa so as to avoid the oxidation of Cu. The defatted laminated molding was introduced into a firing furnace in which the atmosphere had been adjusted to $6.7 \times 10^{-2}$ Pa with an $N_2$—$H_2$—$H_2O$ mixed gas, and was then fired at 1,000° C. for 2 hours. In this manner, a sintered ceramic body in which the Cu wire was embedded in the magnetic body part was produced.

Subsequently, a portion of the Cu wire which protruded from the end surface of the sintered ceramic body was scraped off using a sand blast or a grinder, thereby producing a component body.

Subsequently, an electrically conductive paste for external electrodes which contained Cu or the like as the main component, was applied to both ends of the component body (1), the resultant product was dried and then baked at 900° C. to form external electrodes. The resultant product was subjected to electroplating, thereby forming an Ni coating film and an Sn coating film on the surface of each of the external electrodes. In this manner, laminated inductor samples Nos. 1' and 27' were produced.

Each of samples Nos. 1' and 27' had an outer size of 1.6 mm in length, 0.8 mm in width and 0.8 mm in thickness.

Subsequently, with respect to each of samples Nos. 1' and 27', an impedance property was measured using the impedance analyzer used in Example 1.

Figure 9:
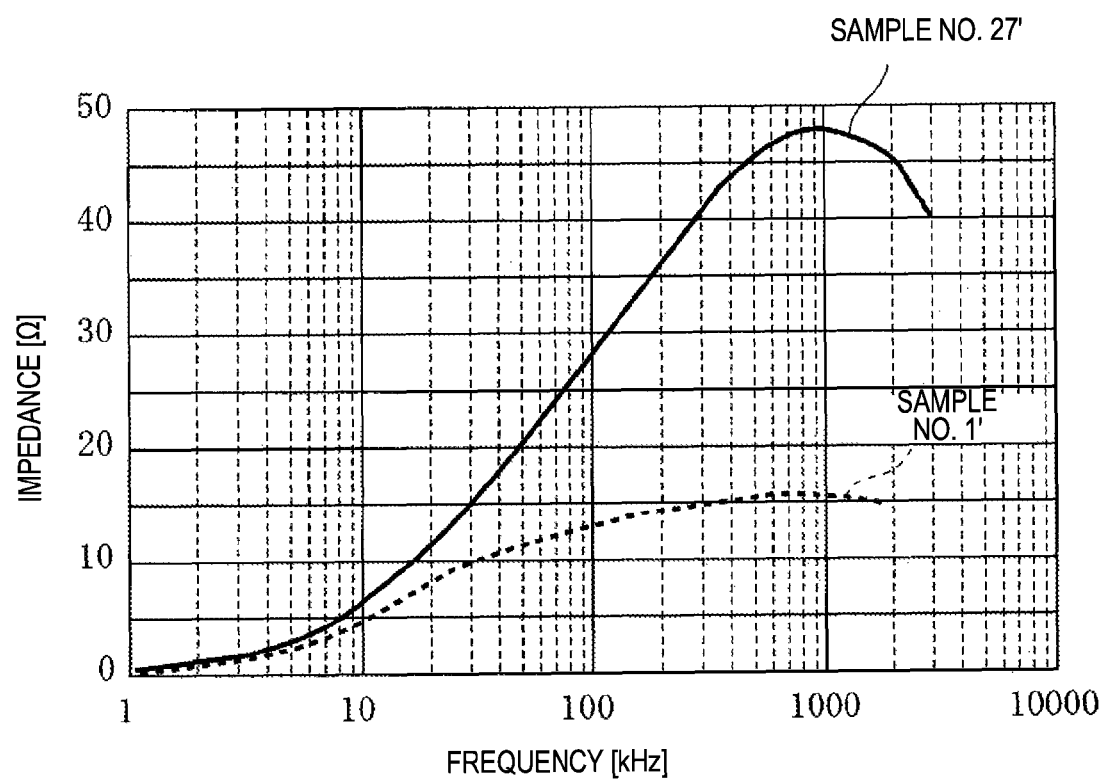
FIG. 9 is a view illustrating the impedance property of a sample produced in Example 2, together with the impedance property of a sample of a comparative example which is out of the scope of the present disclosure.

In FIG. 9, the measurement results are shown. A solid line indicates the impedance property of sample No. 27', which is a sample according to the present disclosure, and a dashed line indicates the impedance property of sample No. 1', which is a sample that is out of the scope of the present disclosure. In the graph, frequencies (MHz) were plotted on the abscissa axis and values of impedance (Ω) were plotted on the ordinate axis.

Sample No. 1' had a specific resistance log ρ of as low as 2.8, and therefore was out of the scope of the present disclosure. Therefore, the highest value of impedance was about 15Ω, and a high level of impedance could not be achieved.

On the contrary, sample No. 27' has a specific resistance log ρ of 7.6 which was sufficiently high, and was within the scope of the present disclosure. Therefore, high impedance could be achieved (i.e., the highest value of impedance was about 50Ω) and a bell-shaped high and desired impedance pattern could be obtained in a specific frequency region.

As mentioned above, the ferrite material can exhibit good insulation performance even when the ferrite material having, embedded therein, an electrically conductive material containing Cu as the main component. Therefore, it becomes possible to provide a ceramic electronic component, such as an inductor, having good insulation performance and good electric properties by using the ferrite material.

In a ferrite ceramic composition according to the present disclosure, the molar content of Cu is 0 to 5 mol % in terms of CuO content and, when the molar content (x (mol %)) of Fe in terms of $Fe_2O_3$ content and the molar content (y (mol %)) of Mn in terms of $Mn_2O_3$ content are expressed by a coordinate point (x,y), the coordinate point (x,y) is located in an area bounded by the above-mentioned coordinate points A to H. Therefore, when the ferrite ceramic composition having a Cu-based material embedded therein is fired, the occurrence of the oxidation of Cu or the reduction of $Fe_2O_3$ can be prevented and, therefore, desired insulation performance can be secured without causing the decrease in a specific resistance ρ.

Specifically, such good insulation performance that the specific resistance ρ is $10^7$ Ω·cm or more can be achieved. Consequently, it becomes possible to produce a desired ceramic electronic component having good electric properties including an impedance property.

Since the molar content of Zn is 33 mol % or less in terms of ZnO content, a sufficient Curie point can be secured and therefore it becomes possible to produce a ceramic electronic component which can be operated under conditions including a high operation temperature.

Further, since the molar content of Zn is 6 mol % or more in terms of ZnO content, good magnetic permeability can be secured.

An embodiment of a ceramic electronic component according to the present disclosure includes a magnetic body part and a metal wire material having a linear or spiral shape and embedded in the magnetic body part, where the metal wire material include an electrically conductive material containing Cu as the main component and the magnetic body part include any of the above-mentioned ferrite ceramic compositions (i.e., those within the scope of the disclosure). Therefore, even when the magnetic body part having the metal wire material embedded therein is fired, the occurrence of the oxidation of Cu or the reduction of $Fe_2O_3$ can be avoided, and it becomes possible to produce a ceramic electronic component having a desired specific resistance ρ and good electric properties.

Even when the magnetic body part having an electrically conductive material containing Cu as the main component embedded therein is fired in an atmosphere having an oxygen partial pressure equal to or lower than the equilibrium oxygen partial pressure for Cu—$Cu_2O$, the magnetic body part can be sintered without undergoing the oxidation of Cu or the reduction of $Fe_2O_3$. Therefore, it becomes possible to produce a chip-type inductor having good electric properties as a ceramic electronic component.

An embodiment of present disclosure includes a process for producing a ceramic electronic component having a calcination step of weighing an Fe compound, an Mn compound, a Cu compound, a Zn compound and an Ni compound precisely in such a manner that a molar content of Cu becomes 0 to 5 mol % in terms of CuO content and, when a molar content (x (mol %)) of Fe in terms of $Fe_2O_3$ content and a molar content (y (mol %)) of Mn in terms of $Mn_2O_3$ content are expressed by a coordinate point (x,y), the coordinate point (x,y) can be located in a specific area bounded by coordinate points A to H, mixing the weighed compounds together, and calcining the resultant mixture, thereby producing a calcined powder; a ceramic thin layer body production step of producing ceramic thin layer bodies from the calcined powder; a laminate formation step of laminating the multiple ceramic thin layer bodies on each other in such a manner that a metal wire material containing Cu as the main component and having a linear shape is intercalated between at least a pair of the ceramic thin layer bodies, thereby forming a laminate; and a firing step of firing the laminate in a firing atmosphere having an oxygen partial pressure equal to or lower than the equilibrium oxygen partial pressure for Cu—$Cu_2O$. Therefore, even when the ferrite material is fired together with a linear metal wire material containing Cu as the main component in a firing atmosphere having an oxygen partial pressure equal to or lower than the equilibrium oxygen partial pressure for Cu—$Cu_2O$, it becomes possible to produce a ceramic electronic component having good insulation performance and good electric properties without undergoing the oxidation of Cu or the reduction of Fe.

An embodiment of present disclosure includes a process for producing a ceramic electronic component having a calcination step of weighing an Fe compound, an Mn compound, a Cu compound, a Zn compound and an Ni compound precisely in such a manner that a molar content of Cu becomes 0 to 5 mol % in terms of CuO content and, when a molar content (x (mol %)) of Fe in terms of $Fe_2O_3$ content and a molar content (y (mol %)) of Mn in terms of $Mn_2O_3$ content are expressed by a coordinate point (x,y), the coordinate point (x,y) can be located in a specific area bounded by coordinate points A to H, mixing the weighed compounds together, and calcining the resultant mixture, thereby producing a calcined powder; a ferrite paste production step of producing a ferrite paste from the calcined powder; a molding production step of placing a metal wire material containing Cu as the main component in a mold, then injecting the ferrite paste into the mold and carrying out a molding treatment to produce a molding; and a firing step of firing the molding in a firing atmosphere having an oxygen partial pressure equal to or lower than the equilibrium oxygen partial pressure for Cu—$Cu_2O$. Therefore, as in the above-mentioned case, it becomes possible to produce a ceramic electronic component having good insulation performance and high reliability without undergoing the oxidation of Cu or the reduction of Fe.

What is claimed is:

1. A ceramic electronic component comprising:
a magnetic body part; and
a metal wire material embedded in the magnetic body part,
wherein the metal wire material comprises an electrically conductive material containing Cu as the main component and the magnetic body part comprises a ferrite ceramic composition, wherein, in the ferrite ceramic composition, a molar content of Cu is 0 to 5 mol % in terms of CuO content and, when a molar content (x (mol %)) of Fe in terms of $Fe_2O_3$ content and a molar content (y (mol %)) of Mn in terms of $Mn_2O_3$ content are expressed by a coordinate point (x,y), the coordinate point (x,y) is located in an area bounded by coordinate points A (25,1), B (47,1), C (47,7.5), D (45,7.5), E (45, 10), F (35,10), G (35,7.5) and H (25,7.5), and in the area bounded, the molar content of Fe is less than 47 mol % in terms of $Fe_2O_3$ content and the molar content of Mn is greater than 1 in terms of $Mn_2O_3$ content.

2. The ceramic electronic component according to claim 1, wherein the metal wire material has a linear shape.

3. The ceramic electronic component according to claim 1, wherein the metal wire material has a spiral shape.

4. The ceramic electronic component according to claim 1, wherein the magnetic body part is fired in an atmosphere having an oxygen partial pressure equal to or lower than the equilibrium oxygen partial pressure for $Cu$—$Cu_2O$.

5. The ceramic electronic component of claim 1, wherein, in the ferrite ceramic composition, the molar content of Zn is 33 mol % or less in terms of ZnO content.

6. The ceramic electronic component according to claim 5, wherein the metal wire material has a linear shape.

7. The ceramic electronic component according to claim 5, wherein the metal wire material has a spiral shape.

8. The ceramic electronic component according to claim 5, wherein the magnetic body part is fired in an atmosphere having an oxygen partial pressure equal to or lower than the equilibrium oxygen partial pressure for $Cu$—$Cu_2O$.

9. The ceramic electronic component of claim 1, wherein, in the ferrite ceramic composition, the molar content of Zn is 6 mol % or more in terms of ZnO content.

10. The ceramic electronic component according to claim 9, wherein the metal wire material has a linear shape.

11. The ceramic electronic component according to claim 9, wherein the metal wire material has a spiral shape.

12. The ceramic electronic component according to claim 9, wherein the magnetic body part is fired in an atmosphere having an oxygen partial pressure equal to or lower than the equilibrium oxygen partial pressure for $Cu$—$Cu_2O$.

13. The ceramic electronic component of claim 1, wherein, in the ferrite ceramic composition, the molar content of Zn is in the range of 6 to 33 mol % in terms of ZnO content.

14. The ceramic electronic component according to claim 13, wherein the metal wire material has a linear shape.

15. The ceramic electronic component according to claim 13, wherein the metal wire material has a spiral shape.

16. The ceramic electronic component according to claim 13, wherein the magnetic body part is fired in an atmosphere having an oxygen partial pressure equal to or lower than the equilibrium oxygen partial pressure for $Cu$—$Cu_2O$.

* * * * *